United States Patent
Fujii et al.

(10) Patent No.: US 10,164,489 B2
(45) Date of Patent: Dec. 25, 2018

(54) ROTARY ELECTRIC MACHINE INCLUDING A CYLINDRICAL MEMBER TO PROVIDE IMPROVED ATTACHMENT BETWEEN A ROTOR CORE AND A DRIVE SHAFT WITH A TAPERED SURFACE FITTED TO THE CYLINDRICAL MEMBER

(71) Applicant: DAIKIN INDUSTRIES, LTD., Osaka-shi, Osaka (JP)

(72) Inventors: Hideki Fujii, Shiga (JP); Kiyotaka Nishijima, Shiga (JP); Masaki Hirano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 480 days.

(21) Appl. No.: 14/404,812

(22) PCT Filed: Jun. 11, 2013

(86) PCT No.: PCT/JP2013/003667
§ 371 (c)(1),
(2) Date: Dec. 1, 2014

(87) PCT Pub. No.: WO2013/187050
PCT Pub. Date: Dec. 19, 2013

(65) Prior Publication Data
US 2015/0145365 A1    May 28, 2015

(30) Foreign Application Priority Data
Jun. 12, 2012 (JP) ................................. 2012-133039

(51) Int. Cl.
*H02K 1/27* (2006.01)
*H02K 1/28* (2006.01)
*H02K 1/30* (2006.01)

(52) U.S. Cl.
CPC ............. *H02K 1/30* (2013.01); *H02K 1/2706* (2013.01); *H02K 1/276* (2013.01); *H02K 1/28* (2013.01)

(58) Field of Classification Search
CPC ............ H02K 1/22; H02K 1/223; H02K 1/27; H02K 1/2706; H02K 1/272; H02K 1/274;
(Continued)

(56) References Cited

U.S. PATENT DOCUMENTS

| 2,493,102 | A |   | 1/1950 | Brainard |
| 5,704,111 | A | * | 1/1998 | Johnson .................. H02K 1/30 29/451 |

(Continued)

FOREIGN PATENT DOCUMENTS

| DE | 4341514 A1 | 6/1995 |
| JP | 2-94444 U | 7/1990 |

(Continued)

OTHER PUBLICATIONS

International Search Report, dated Sep. 3, 2013, issued in PCT/JP2013/003667.

*Primary Examiner* — Quyen Leung
*Assistant Examiner* — Minki Chang
(74) *Attorney, Agent, or Firm* — Birch, Stewart, Kolasch & Birch, LLP

(57) ABSTRACT

A rotor core formed with a shaft hole at the center thereof is provided. A cylindrical member fitted into the shaft hole of the rotor core along an outer peripheral surface of the cylindrical member is provided. A drive shaft inserted into a hollowed part of the cylindrical member (collar) is provided. The collar is made of the material having a lower Young's modulus than those of the rotor core and the drive shaft, and is formed such that an inner peripheral surface of the collar is a tapered surface. The drive shaft has, at an outer (Continued)

periphery thereof, a tapered surface such that the tapered surface is in surface contact with the tapered surface of the collar in fitting of the drive shaft into the collar.

5 Claims, 4 Drawing Sheets

(58) Field of Classification Search
CPC ............ H02K 1/28; H02K 1/30; H02K 7/003;
H02K 17/16
USPC ........ 310/152, 156.01, 156.08, 216.119, 121
See application file for complete search history.

(56) References Cited

U.S. PATENT DOCUMENTS

| 2012/0220379 | A1* | 8/2012 | Murakami | ............... | H02K 9/19 |
| | | | | | 464/7 |
| 2012/0326555 | A1* | 12/2012 | Arimatsu | ................. | H02K 1/30 |
| | | | | | 310/216.121 |
| 2014/0064839 | A1* | 3/2014 | Miyazaki | ............... | H02K 51/00 |
| | | | | | 403/359.1 |

FOREIGN PATENT DOCUMENTS

| JP | 2000-245086 A | 9/2000 |
| JP | 2001-186701 A | 7/2001 |
| JP | 4586531 B2 | 11/2010 |
| JP | 2011-19298 A | 1/2011 |

* cited by examiner d1>d2

ROTARY ELECTRIC MACHINE INCLUDING A CYLINDRICAL MEMBER TO PROVIDE IMPROVED ATTACHMENT BETWEEN A ROTOR CORE AND A DRIVE SHAFT WITH A TAPERED SURFACE FITTED TO THE CYLINDRICAL MEMBER

TECHNICAL FIELD

The present invention relates to a rotary electric machine, and particularly relates to a rotor structure.

BACKGROUND ART

Rotary electric machines capable of rotatably driving, e.g., compression mechanisms have been known. The rotary electric machine of this type includes a rotor attached to a drive shaft and a stator disposed at the outer periphery of the rotor, and rotatably drives the compression mechanism by rotating the drive shaft. In order to resist the centrifugal force of rotation, rotors of rotary electric machines used for electric motors for high-speed rotation employ a press-fitting attachment structure in which a sleeve or a collar is press-fitted into a space between a rotor core and a shaft (see Patent Document 1).

CITATION LIST

Patent Document

PATENT DOCUMENT 1: Japanese Patent No. 4586531

SUMMARY OF THE INVENTION

Technical Problem

However, only with the press-fitting attachment structure, there is a possibility that sufficient attachment force cannot be ensured when the rotator rotates at high speed. Moreover, since the temperature of the rotor increases in operation, the rotor core is expanded in a radial direction, and this leads to weakening of attachment force as is expected.

The present invention has been made in view of the foregoing, and is intended to further ensure attachment between a rotor core and a drive shaft.

Solution to the Problem

In order to solve the foregoing problem, a first aspect of the invention is intended for a rotary electric machine including a rotor core (12) in which a shaft hole (12a) is formed at the center of the rotor core (12); a cylindrical member (60) formed in a cylindrical shape and fitted into the shaft hole (12a) of the rotor core (12) along an outer peripheral surface of the cylindrical member (60); and a drive shaft (50) inserted into a hollowed part (60b) of the cylindrical member (60). The cylindrical member (60) is made of the material having a lower Young's modulus than those of the rotor core (12) and the drive shaft (50), and is formed such that an inner peripheral surface of the cylindrical member (60) is a tapered surface (60a). The drive shaft (50) has, at an outer periphery thereof, a tapered surface (54a) such that the tapered surface (54a) is in surface contact with the tapered surface (60a) of the cylindrical member (60) in fitting of the drive shaft (50) into the cylindrical member (60).

According to the foregoing configuration, the drive shaft (50) and the cylindrical member (60) contact each other at the tapered surfaces (54a, 60a). For example, when the drive shaft (50) is press-fitted into the cylindrical member (60) in an axial direction, the cylindrical member (60) deforms such that the outer diameter thereof increases. In such a state, the drive shaft (50) is less deformed as compared to the cylindrical member (60), or is little deformed. This is because the cylindrical member (60) is made of the material having a lower Young's modulus than that of the drive shaft (50). When the outer diameter of the cylindrical member (60) increases, the cylindrical member (60) and the rotor core (12) are more firmly attached to each other. This is because the cylindrical member (60) is made of the material having a lower. Young's modulus than that of the rotor core (12).

A second aspect of the invention is intended for the rotary electric machine of the first aspect of the invention, in which the outer diameter of the cylindrical member (60) is larger than the inner diameter of the shaft hole (12a) of the rotor core (12).

According to the foregoing configuration, the cylindrical member (60) and the rotor core (12) can be fixed together by a method such as press-fitting or shrink fitting.

A third aspect of the invention is intended for the rotary electric machine of the first or second aspect of the invention, in which a permanent magnet (14) is embedded in the rotor core (12).

According to the foregoing configuration, the drive shaft (50), the cylindrical member (60), and the rotor core (12) are firmly attached to each other in the so-called "interior permanent magnet-type rotary electric machine."

A fourth aspect of the invention is intended for the rotary electric machine of the third aspect of the invention, in which the rotor core (12) is formed such that magnetic steel sheets are stacked on each other.

According to the foregoing configuration, the drive shaft (50), the cylindrical member (60), and the rotor core (12) are firmly attached to each other in the rotor core having the multilayer structure.

A fifth aspect of the invention is intended for the rotary electric machine of the fourth aspect of the invention, in which the permanent magnet (14) is fixed in the rotor core (12) by deformation of the rotor core (12) due to expansion of the cylindrical member (60) in fitting of the drive shaft (50) into the cylindrical member (60).

According to the foregoing configuration, in the so-called "interior permanent magnet-type rotary electric machine," the permanent magnet (14) is fixed in the rotor core (12) by expansion of the cylindrical member (60).

Advantages of the Invention

According to the first aspect of the invention, the drive shaft (50), the cylindrical member (60), and the rotor core (12) are more firmly attached to each other as compared to a conventional rotor in which a drive shaft, a cylindrical member, and a rotor core are attached to each other by shrink fitting. Thus, in the case where high-speed rotation is required for the rotary electric machine, or the case where the temperature of the rotor (rotor core (12)) is likely to increase in operation, it can be ensured that the function of the rotary electric machine is fulfilled.

According to the second aspect of the invention, the cylindrical member (60) and the rotor core (12) can be fixed together in advance.

According to the third aspect of the invention, the structure of the so-called "interior permanent magnet-type rotary electric machine" can improve the heat dissipating characteristics of the rotor at the surface thereof, and the magnet can be sufficiently cooled through the rotor surface. As a result, an output density can be increased.

According to the fourth aspect of the invention, eddy current at the surface of the rotor core can be decreased.

According to the fifth aspect of the invention, it can be further ensured that the permanent magnet (14) and the rotor core (12) contact each other, resulting in improvement of the performance of cooling the permanent magnet (14).

DESCRIPTION OF EMBODIMENTS

An embodiment of the present invention will be described below with reference to drawings. Note that the embodiment described below will be set forth merely for the purpose of a preferred example in nature, and is not intended to limit the scope, application, and use of the invention.

Embodiment of the Invention

Figure 1:
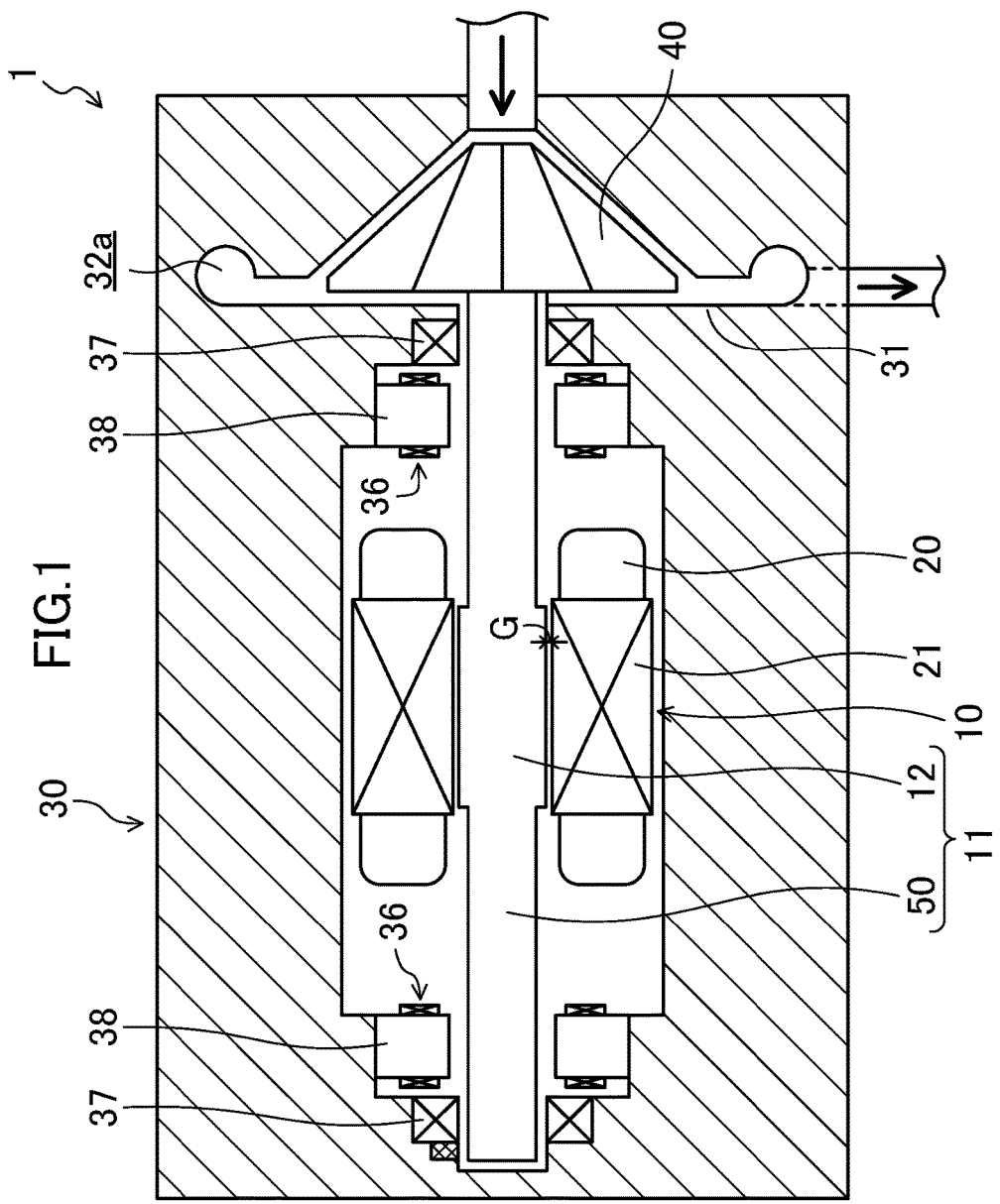
FIG. 1 is a schematic cross-sectional view illustrating the configuration of a compressor using a motor of an embodiment of the present invention.

FIG. 1 is a schematic cross-sectional view illustrating the configuration of a compressor (1) using a motor (10) of the present embodiment. The compressor (1) is connected to a refrigerant circuit in which refrigerant circulates to perform a refrigeration cycle, and is capable of compressing refrigerant flowing through the refrigerant circuit. The compressor (1) is a so-called "turbo compressor." Referring to FIG. 1, the compressor (1) includes the motor (10), a casing (30), and an impeller (40).

The casing (30) is a cylindrical container closed at both ends thereof. A space in the casing (30) is divided by a wall part (31). The impeller (40) is housed in the right space relative to the wall part (31), and the motor (10) is housed in the left space relative to the wall part (31). Moreover, bearing mechanisms (36) capable of supporting a shaft (50) of the motor (10) are provided in the casing (30). Each bearing mechanism (36) includes touchdown bearings (37) and magnet bearings (38). The magnet bearings (38) are capable of supporting, using magnetic force, the shaft (50) in a non-contact state. The touchdown bearings (37) are, e.g., ball bearings, and are capable of supporting the shaft (50) when the magnet bearings (38) are non-energized.

<Configuration of Motor>

The motor (10) is used for driving the impeller (40). The motor (10) is an example of a rotary electric machine of the present invention. In this example, the motor (10) is a brushless DC motor. More specifically, the motor (10) is a so-called "interior permanent magnet motor" (hereinafter sometimes referred to as an "IPM motor"). The motor (10) includes a rotor (11) and a stator (21), and is housed in the casing (30) of the compressor (1). Note that, in the present embodiment, an axial direction refers to the direction along the center of the shaft (50) of the rotor (11), and a radial direction refers to the direction perpendicular to the axial direction of the shaft (50). Moreover, an outer peripheral side refers to the side farther from the center of the shaft (50), and an inner peripheral side refers to the side closer to the center of the shaft (50).

<Configuration of Stator>

Figure 2:
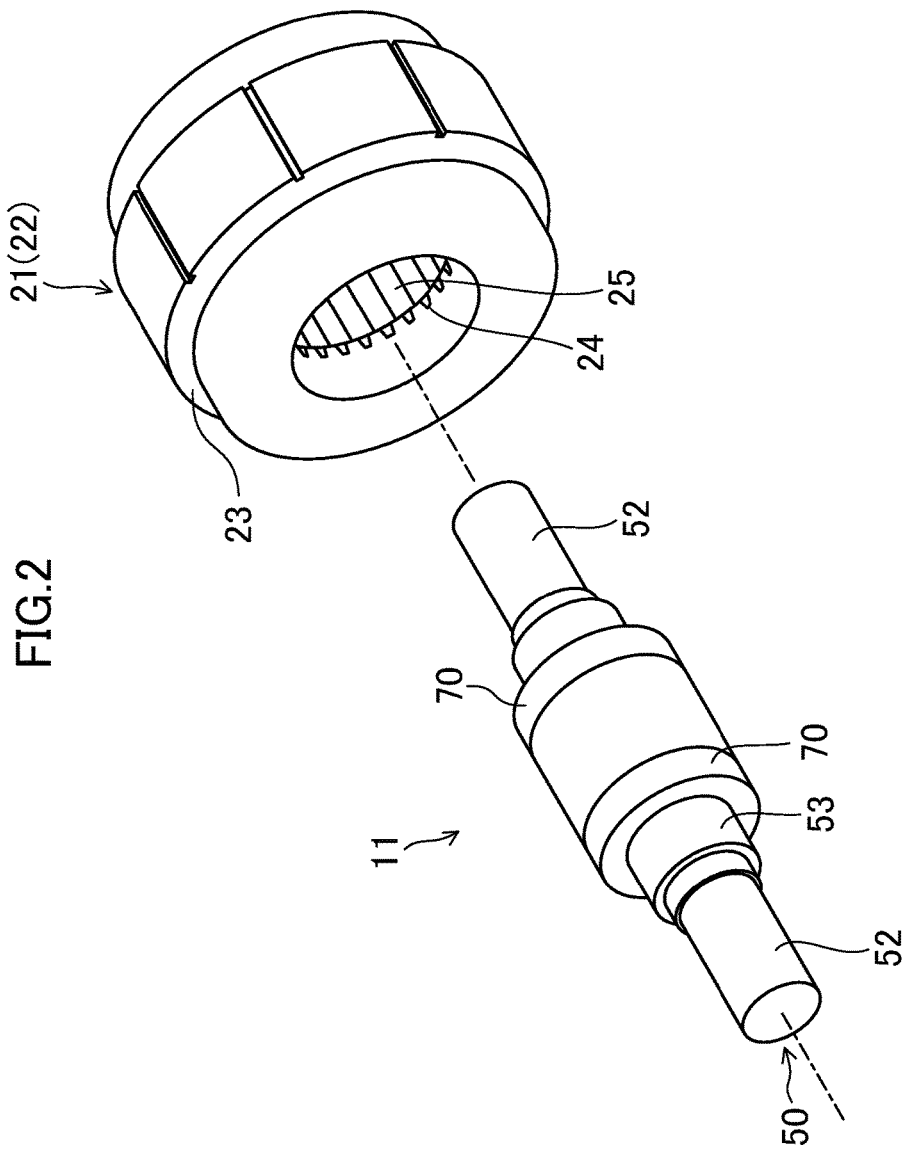
FIG. 2 is a perspective view illustrating the configuration of the motor of the embodiment.

FIG. 2 is a perspective view illustrating the configuration of the motor (10) of the embodiment. The stator (21) includes a cylindrical stator core (22) and a coil (20) (not shown in FIG. 2). The stator core (22) is a multilayer core formed in such a manner that magnetic steel sheets are, by pressing, punched out to form a plurality of plates for stacking and then the plates for stacking are stacked on each other in the axial direction. The stator core (22) includes a back yoke part (23), a plurality of tooth parts (24), and a plurality of brim parts (25). The back yoke part (23) is formed at the outer periphery of the stator core (22), and is in an annular shape. The outer periphery of the back yoke part (23) is fixed to an inner surface of the casing (30). Each tooth part (24) is formed in a rectangular parallelepiped shape extending from an inner peripheral surface of the back yoke part (23) in the radial direction. A coil slot in which the coil (20) is to be housed is formed between each adjacent ones of the tooth parts (24). The coil (20) is wrapped around the tooth part (24). The wrapped coil (20) is housed in the coil slots. Thus, an electric magnet is formed at each tooth part (24). Each brim part (25) is continuously formed on the inner peripheral side of a corresponding one of the tooth parts (24). Each brim part (25) is formed so as to have a greater width (length in a circumferential direction) than that of a corresponding one of the tooth parts (24), and inner peripheral surfaces of the brim parts (25) form a cylindrical surface. The cylindrical surface of the brim parts (25) faces an outer peripheral surface (cylindrical surface) of the rotor (11) with a predetermined distance (i.e., an air gap (G)).

<Configuration of Rotor>

Figure 3:
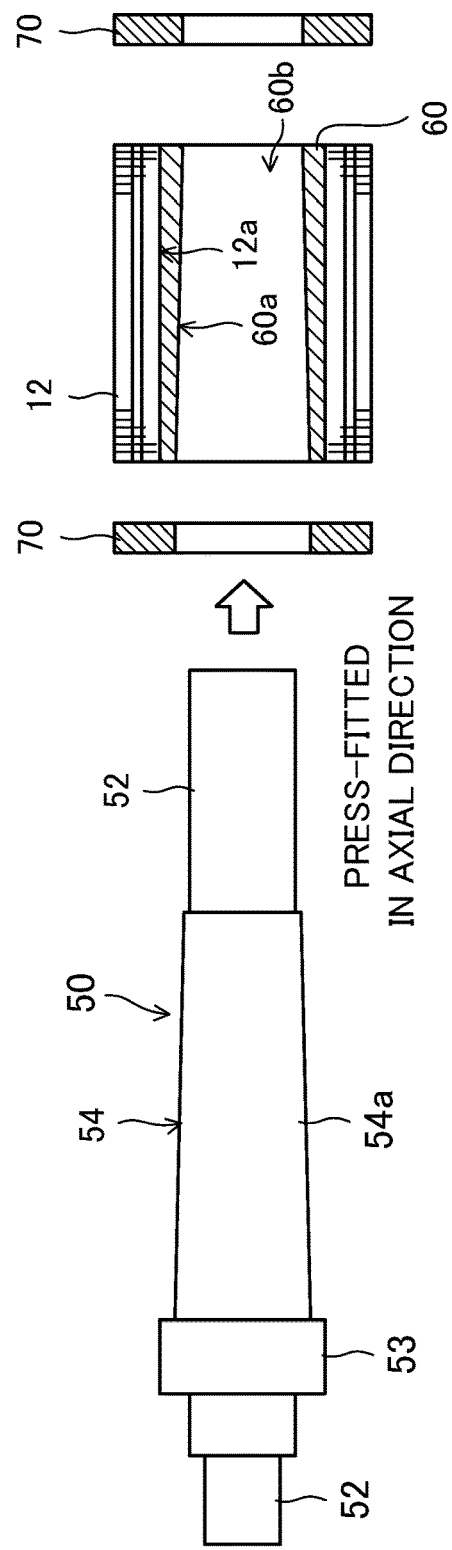
FIG. 3 is a view illustrating the configuration of a rotor and illustrating the state of the rotor before assembly of components.
Figure 4:
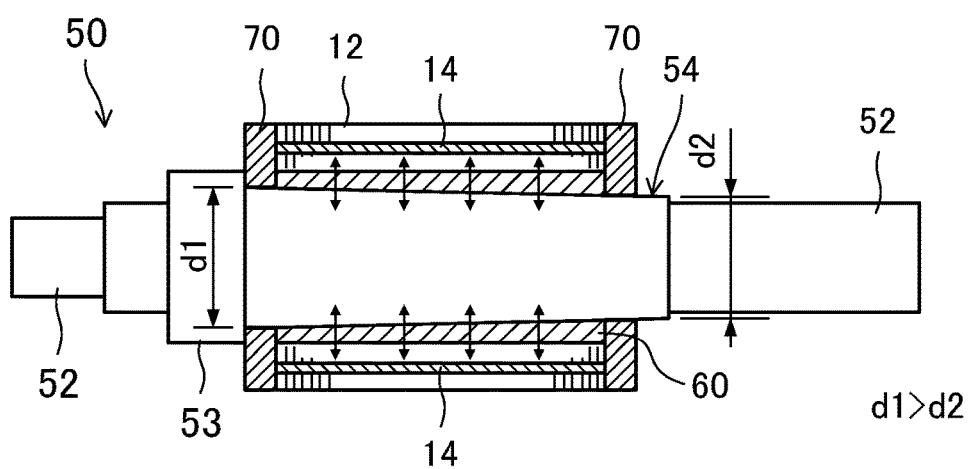
FIG. 4 is a cross-sectional view illustrating the state of the assembled rotor.

FIG. 3 is a view illustrating the configuration of the rotor (11), and illustrates the state before assembly of components. Moreover, FIG. 4 is a cross-sectional view illustrating the state of the assembled rotor (11). The rotor (11) includes a rotor core (12), permanent magnets (14), a collar (60), the shaft (50), and end plates (70).

Rotor Core

The rotor core (12) is a multilayer core formed in such a manner that magnetic steel sheets are, by pressing, punched out to form a plurality of plates for stacking and then the plates for stacking are stacked on each other in the axial direction. Referring to FIG. 3, a shaft hole (12a) into which the shaft (drive shaft) (50) for driving the compressor (1) is inserted is formed at the center of the rotor core (12). Moreover, the permanent magnets (14) are embedded in the rotor core (12) (see FIG. 4).

Different materials may be used for the stator core (22) and the rotor core (12). For example, magnetic steel sheets with low iron loss (particularly preferably a magnetic steel sheet with low eddy-current loss) may be used for the stator core (22), and high-strength magnetic steel sheets may be used for the rotor core (12). Turbo compressors such as the compressor (1) of the present embodiment are in the field of low-volume production, and the percentage of the cost for the rotor cores (12) and the stator cores (22) in the total cost for the motors (10) is small. Thus, even if different materials are used for the stator core (22) and the rotor core (12), and an inner part of the magnetic steel sheet punched out by pressing in formation of the stator core (22) is discarded, it is less likely to influence the cost. The high-strength magnetic steel sheets used for the rotor core (12) typically exhibit poor iron loss characteristics. However, since iron loss is lower on a rotor side than on a stator side, use of the high-strength magnetic steel sheets for the rotor core (12) has almost no influence on a motor efficiency.

Collar

Referring to FIG. 3, the collar (60) is in a cylindrical shape having a hollowed part (60b). The collar (60) is an example of a cylindrical member of the present invention. The outer diameter of the collar (60) is constant across the entire length thereof, and is slightly larger than the inner diameter of the shaft hole (12a) of the rotor core (12). Note that the outer diameter of the collar (60) is set so that the collar (60) can be press into the shaft hole (12a) of the rotor core (12) with relatively weak force. The strength of attachment between the collar (60) and the shaft hole (12a) by press-fitting may be less than the strength required in use of the rotor (11).

An inner peripheral surface of the collar (60) is such a tapered surface (60a) that the inner diameter of the collar (60) decreases from the left to the right as viewed in FIG. 3. The material having a lower Young's modulus than those of the rotor core (12) and the shaft (50) is used as the material forming the collar (60).

Shaft

The shaft (50) includes straight parts (52), a stopper part (53), and a tapered part (54) (see FIG. 3). The shaft (50) is made of, e.g., chrome molybdenum steel. The straight parts (52) are both end parts of the shaft (50). One of the straight parts (52) is supported by one of the bearing mechanisms (36), and is connected to the impeller (40). The other one of the straight parts (52) is supported by the other one of the bearing mechanisms (36). The stopper part (53) is a cylindrical columnar part having a larger outer diameter than that of the straight parts (52).

The stopper part (53) is used for determining the positions of the end plates (70) in the axial direction. The tapered part (54) has such a tapered surface (54a) that the inner diameter of the tapered part (54) decreases from the left to the right as viewed in FIG. 3 (see FIG. 3). The outer diameters (d1, d2) and the tapered angle of the tapered part (54) are set such that the tapered part (54) is fitted into the collar (60) in surface contact between the tapered surface (54a) and the tapered surface (60a).

End Plate

Each end plate (70) is a cylindrical member, and there are two end plates (70) at the shaft (50). The end plates (70) function to prevent detachment of the permanent magnets (14) inserted into the rotor core (12). Moreover, imbalance in the entirety of the rotor (11) can be corrected in such a manner that the end plate(s) (70) is shaved or that a weight(s) is attached to the end plate(s) (70).

<Manufacturing of Rotor>

In order to manufacture the rotor (11) of the present embodiment, the rotor core (12) is first fixed to the collar (60), thereby forming the rotor core (12) provided with the collar (60). In the present embodiment, the collar (60) and the rotor core (12) are fixed together in such a manner that the collar (60) is press-fitted into the shaft hole (12a) of the rotor core (12). Needless to say, the collar (60) and the rotor core (12) can be fixed together by other method such as shrink fitting.

Next, the shaft (50) is inserted into one of the end plates (70) until such an end plate (70) reaches the position of the stopper part (53) of the shaft (50). Then, the tapered part (54) of the shaft (50) is, from the left as viewed in the FIG. 3, inserted into the hollowed part (60b) of the collar (60), and is press-fitted into the hollowed part (60b) of the collar (60) by pressurization in the axial direction. The tapered part (54) and the hollowed part (60b) of the collar (60) contact (surface-contact) each other at the tapered surfaces (54a, 60a). Since the shaft (50) is press-fitted in the axial direction as just described, the collar (60) is, as indicated by arrows in FIG. 4, deformed such that the outer diameter thereof increases. On the other hand, the shaft (50) is less deformed as compared to the collar (60), or is little deformed. This is because the collar (60) is made of the material having a lower Young's modulus than that of the shaft (50).

When the outer diameter of the collar (60) increases (i.e., the collar (60) expands), the collar (60) and the rotor core (12) is more firmly attached to each other. This is because the collar (60) is made of the material having a lower Young's module than that of the rotor core (12). Next, the permanent magnets (14) are inserted into the rotor core (12), and the rotor core (12) provided with the permanent magnets (14) is covered by the other end plate (70). In this manner, assembly of the rotor (11) is completed (see FIG. 4).

Note that deformation of the rotor core (12) due to expansion of the collar (60) may be used to fix the permanent magnets (14) in the rotor core (12). For example, the permanent magnets (14) are pre-inserted respectively into magnet slots (holes for permanent magnet insertion) formed at the rotor core (12), and the collar (60) is inserted (e.g., press-fitted) into the rotor core (12). Then, when the collar (60) expands by insertion (press-fitting) of the shaft (50) into the collar (60), the permanent magnets (14) are pressed against the outer peripheral side of the magnet slots, and are fixed.

As just described, since the permanent magnets (14) are fixed using deformation of the rotor core (12) due to expansion of the collar (60), it can be further ensured that the permanent magnets (14) and the rotor core (12) contact each other, resulting in improvement of the performance of cooling the permanent magnets (14).

Since the shaft (50) is press-fitted into the tapered structure, the rotor core (12) can be uniformly deformed across the entire length in the stacking direction. Thus, no cracking of the permanent magnets (14) occurs during deformation (press-fitting) of the rotor core (12). The permanent magnets (14) can be fixed concurrently with the step of integrating the rotor core (12) and the shaft (50). That is, assembly steps can be simplified.

Advantages of the Present Embodiment

As described above, the collar (60) is made of the material having a lower Young's modulus than those of the rotor core (12) and the shaft (50), and the attachment surface between the collar (60) and the shaft (50) is defined by the tapered surfaces (54a, 60a). Thus, according to the present embodiment, the shaft (50), the collar (60), and the rotor core (12) are more firmly attached to each other as compared to a conventional rotor in which a shaft, a collar, and a rotor core are attached to each other by shrink fitting. Note that the attachment strength of the shaft (50), the collar (60), and the rotor core (12) can be adjusted by the mechanical characteristics (Young's modulus) of the material of the collar (60) and the tapered angle of each tapered surface (54a, 60a).

For example, surface permanent magnet motors (hereinafter sometimes referred to as "SPM motors") are often employed for conventional compressors of turbo refrigerators and large-capacity (large-diameter) motors to be driven at high speed, and the structure in which a reinforcement ring is provided at the outer periphery of a magnet is typically employed for such SPM motors. Since the reinforcement ring is provided at the outer periphery of the magnet, there are some SPM motors in each of which a shaft is press-fitted to deform a rotor core disposed on an inner peripheral side of a magnet such that a sufficient attachment margin between a reinforcement ring and the magnet is ensured. In other SPM motors, a reinforcement ring holds a magnet provided on a rotor with the magnet being pushed outwardly, and a shaft, a rotor core, the magnet, and the reinforcement ring are integrated together. In an example of such a structure, the shaft and the rotor core are tapered to ensure, in press-fitting, a uniform attachment margin across the entire length in an axial direction.

However, in IPM motors as in the present embodiment, it is often the case that a rotor core has a multilayer structure of steel plates, and the inner diameter of a hole to be a shaft insertion hole is the same among the steel plates. Thus, the rotor core cannot be tapered at the shaft insertion hole. Moreover, even if a shaft is press-fitted into the rotor core, it is difficult to ensure a uniform attachment margin across the entire length in an axial direction.

On the other hand, in the present embodiment, the collar (60) having a lower Young's modulus than those of the rotor core (12) and the shaft (50) is provided between the shaft (50) and the rotor core (12), and the inner surface of the collar (60) and the outer periphery of the shaft (50) are tapered. Thus, in press-fitting, a uniform attachment margin can be ensured across the entire length in the axial direction.

In the case where the multilayer structure of the steel plates is employed as the structure of the rotor core, if the steel plates are processed by pressing, shear droop and burrs occur due to pressing, and it is likely that an inner surface of the hole into which the shaft is inserted is roughened. The shaft is typically made of a high-strength material such as chrome molybdenum steel. If the rotor core and the shaft are directly attached to each other, attachment force is less likely to be ensured due to small deformation of the rotor core and the shaft. As a result, the degree of contact between the rotor core and the shaft is low, and therefore it is less likely to ensure sufficiently-firm attachment between the rotor core and the shaft.

However, if the collar (60) having a lower Young's modulus than those of the rotor core (12) and the shaft (50) is provided between the rotor core (12) and the shaft (50) as in the present embodiment, the collar (60) itself is deformed, and the rotor core (12), the shaft (50), and the collar (60) are sufficiently firmly attached to each other due to an increase in the degree of contact among the rotor core (12), the shaft (50), and the collar (60). A higher degree of contact results in higher heat transfer performance between the shaft (50) and the rotor core (12), and therefore heat generated at the rotor (I 1) can be efficiently released toward the shaft (50). That is, in the case where high-speed rotation is required for the motor (10), or the case where the temperature of the rotor is likely to increase in operation, it can be ensured that the function of the motor is fulfilled.

Since the rotor core has the multilayer structure of the steel plates in the present embodiment, eddy current at the surface of the rotor core can be decreased.

Other Embodiments

The rotor core (12) may be a so-called "powder magnetic core."

The structure of the rotor (11) is not limited to the motor (10), but is applicable to a generator.

The attachment structure of the permanent magnets (14) has been described as an example. Moreover, the end plates (70) are not necessarily provided.

The method for processing the magnetic steel sheets forming the rotor core (12) and the stator core (22) is not limited to pressing. For example, processing using wire cut or laser may be employed.

The structure for attaching the shaft (50), the collar (60), and the rotor core (12) to each other may be employed for the SPM motors. A rotor core formed such that magnetic steel plates are stacked on each other or a powder magnetic core may be employed for the SPM motors.

In the case of employing the IPM motor, advantages different from those in the case of the SPM motor can be realized.

For example, a cylindrical metal reinforcement ring is, in some cases, used at the outer periphery of a magnet in the SPM motor. In such a case, eddy-current loss occurs at a surface of the cylindrical reinforcement ring. If a cylindrical reinforcement ring made of carbon fiber reinforced plastic (CFRP) is employed, no eddy current occurs. However, since a predetermined thickness of the cylindrical reinforcement ring is required in order to ensure the strength against centrifugal force, a magnetic air gap becomes greater. A greater magnetic air gap may result in an adverse effect on motor performance.

On the other hand, such an outer peripheral reinforcement rings (made of, e.g., CFRP, stainless steel (SS), or inconel) is not required for the IPM motor, and a magnetic air gap can be smaller. Thus, the IPM motor can realize the same performance as that of the SPM motor with a smaller magnet volume.

The reinforcement ring made of CFRP and used for the SPM motor exhibits poor heat transfer characteristics, and the output density of the motor cannot be increased due to temperature restriction (typically around 100° C.) of CFRP. However, the IPM motor can be employed to improve the heat dissipation characteristics of the rotor at the surface thereof, thereby sufficiently cooling the magnet through the rotor surface. As a result, the output density can be increased.

As just described, the foregoing attachment structure allows IPM motors and IPM generators (interior permanent magnet generators) to be used as motors for turbo compressors having an output of several hundreds kW and operating at several tens of thousands rpm or as generators for turbo generator systems. Moreover, interior permanent magnet-type rotary electric machines (the term "rotary electric machine" is used as the name collectively indicating motors and generators) can realize a higher output density with a smaller magnet volume as compared to surface-magnet type rotary electric machines.

INDUSTRIAL APPLICABILITY

The present invention is useful as a rotor structure of a rotary electric machine (e.g., a motor or a generator).

DESCRIPTION OF REFERENCE CHARACTERS

10 Motor (Rotary Electric Machine)
12 Rotor Core
12a Shaft Hole
14 Permanent Magnet
50 Shaft
50 Shaft (Drive Shaft)
54a Tapered Surface

60 Collar (Cylindrical Member)
60a Tapered Surface
60b Hollowed Part
70 End Plate

The invention claimed is:

1. A rotary electric machine comprising:
a rotor core in which a shaft hole is formed at a center of the rotor core;
a cylindrical member formed in a cylindrical shape and fitted into the shaft hole of the rotor core along an outer peripheral surface of the cylindrical member; and
a drive shaft inserted into a hollowed part of the cylindrical member,
wherein the cylindrical member is made of a material having a lower Young's modulus than those of the rotor core and the drive shaft, and is formed such that an inner peripheral surface of the cylindrical member is a tapered surface,
the drive shaft includes a tapered part which has, at an outer periphery thereof, a tapered surface such that the tapered surface is in surface contact with the tapered surface of the cylindrical member in fitting of the drive shaft into the cylindrical member,
in the longitudinal direction, each end of the cylindrical member is substantially coextensive with the corresponding end of the rotor core,
the drive shaft has a stopper part adjacent to the tapered part in an axial direction, the stopper part being configured to fix a first end plate against one end of the rotor core and the corresponding end of the cylindrical member in the axial direction, wherein a second end plate is press fitted against the other ends of the rotor core and the cylindrical member, respectively, in the axial direction,
a permanent magnet is embedded in the rotor core,
the rotor core is formed such that magnetic steel sheets are stacked on each other,
the permanent magnet is fixed in the rotor core by deformation of the rotor core due to expansion of the cylindrical member in fitting of the drive shaft into the cylindrical member, and
each of the first and second end plates covers a respective end of the permanent magnet left exposed by a respective one of the two magnetic steel sheets defining opposite ends of the rotor core, each of the first and second end plates being thicker than the individual thicknesses of the magnetic steel sheets, the first and second end plates being made of a material that can be shaved to correct rotor imbalance.

2. The rotary electric machine of claim 1, wherein an outer diameter of the cylindrical member is larger than an inner diameter of the shaft hole of the rotor core.

3. The rotary electric machine of claim 2, wherein a permanent magnet is embedded in the rotor core.

4. The rotary electric machine of claim 3, wherein the rotor core is formed such that magnetic steel sheets are stacked on each other.

5. The rotary electric machine of claim 4, wherein the permanent magnet is fixed in the rotor core by deformation of the rotor core due to expansion of the cylindrical member in fitting of the drive shaft into the cylindrical member.

* * * * *